(No Model.)
G. BERND.
SNAP HOOK.
No. 339,039. Patented Mar. 30, 1886.
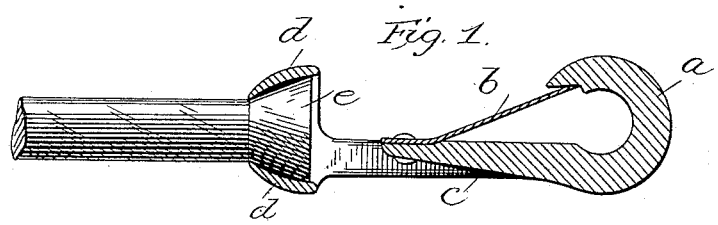
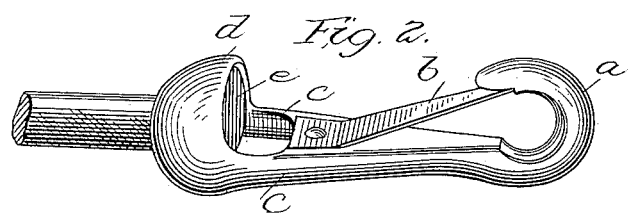
Attest:
Wallern Donaldson
F. L. Middleton
Inventor
G. Bernd
by Joyce & Spear
Atty's.

United States Patent Office.

GUSTAVE BERND, OF MACON, GEORGIA.

SNAP-HOOK.

SPECIFICATION forming part of Letters Patent No. 339,039, dated March 30, 1886.

Application filed January 2, 1886. Serial No. 187,446. (No model.)

*To all whom it may concern:*

Be it known that I, GUSTAVE BERND, of Macon, in the county of Bibb and State of Georgia, have invented a new and useful Improvement in Snap-Hooks; and I do hereby declare that the following is a full, clear, and exact description of the same.

My invention is an improved snap-hook of that class in which the hook is held to the rope, leather, metal, or other material by means of a socket, as shown in Letters Patent of the United States No. 252,832.

The improvement consists in forming the swivel or socket of the hook shown in said patent with an offset and a smooth back, whereby the knotted or headed leather, rope, or other material can be admitted and worked more easily.

In the accompanying drawings, Figure 1 shows a longitudinal section of the improved snap; Fig. 2, a perspective view of the same.

In these drawings the hook $a$ and spring $b$ are the same as in the aforesaid patent. The shank $c$ is approximately straight, and the branches thereof join the cup or socket $d$ at one side. This leaves the main body of the cup projecting from the shank to one side, and the cup is thus left open and unobstructed to receive the head or knot $e$ of the cord, strap, or other material. Further, the shank $b$ is made straight, which also avoids obstructing the passage of the knot or head as it is drawn into the cup. The rear of the shank is practically flush with the side of the cup, and is very nearly straight. This avoids a defect in the aforesaid snap-hook, arising from roughness or uneven surface on both sides. It also adapts it for use with cheek-pieces of bridles, lines, wood, or metal, and like situations.

I limit my claim to the described form of swivel, which is especially designed to be used in connection with rope or round strap, although the hook is more especially adapted for rope. As the object is to hold the rope securely and allow the hook to turn thereon, the construction shown in the patent heretofore referred to is found to be defective in this, that the knot by which the rope is held in the socket is crowded by the branches of the shank and cannot enter into the socket or turn therein; but where the shank is set upon one side and the swivel is eccentric thereto the socket is adapted to receive freely the knot and to allow it to turn.

I claim as my invention—

A snap-hook consisting of a hook and spring provided with a straight shank combined with a round swivel, a socket eccentric to the shank and adapted to receive the knot of the rope, as shown.

In testimony whereof I have signed my name to this specification in the presence of two subscribing witnesses.

G. BERND.

Witnesses:
   J. F. MINTON,
   JAMES J. COBB.